(12) United States Patent
Kasahara (10) Patent No.: US 7,726,437 B2
(45) Date of Patent: Jun. 1, 2010

(54) VEHICLE STEERING CONTROLLER AND METHOD

(75) Inventor: Toshiaki Kasahara, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 648 days.

(21) Appl. No.: 11/601,171

(22) Filed: Nov. 17, 2006

(65) Prior Publication Data

US 2007/0137921 A1    Jun. 21, 2007

(30) Foreign Application Priority Data

Nov. 19, 2005    (JP) .............................. 2005-335067

(51) Int. Cl.
*B62D 5/00* (2006.01)
(52) U.S. Cl. ........................ 180/405; 180/402; 180/444; 180/446
(58) Field of Classification Search ................. 180/405, 180/402, 444, 446
See application file for complete search history.

(56) References Cited

U.S. PATENT DOCUMENTS

| | | | | |
|---|---|---|---|---|
| 6,913,107 B2* | 7/2005 | Sato et al. | ................... | 180/402 |
| 6,926,112 B2* | 8/2005 | Husain et al. | ............... | 180/402 |
| 6,929,086 B1* | 8/2005 | Husain et al. | ............... | 180/413 |
| 7,004,279 B2* | 2/2006 | Shitamitsu et al. | .......... | 180/402 |
| 7,007,769 B2* | 3/2006 | Hara et al. | ................... | 180/402 |
| 7,174,987 B2* | 2/2007 | Husain | ....................... | 180/402 |
| 7,322,439 B2* | 1/2008 | Hara et al. | ................... | 180/402 |
| 7,469,768 B2* | 12/2008 | Chino et al. | ................ | 180/405 |
| 7,526,372 B2* | 4/2009 | Tsutsumi et al. | .............. | 701/43 |
| 2004/0262072 A1* | 12/2004 | Hara et al. | ................... | 180/402 |
| 2007/0131476 A1* | 6/2007 | Kubokawa et al. | ........... | 180/444 |

FOREIGN PATENT DOCUMENTS

| | | |
|---|---|---|
| EP | 1 481 874 A2 | 12/2004 |
| EP | 1 698 539 A1 | 9/2006 |
| JP | 2002-225733 | 8/2002 |

* cited by examiner

*Primary Examiner*—Lesley Morris
*Assistant Examiner*—Michael R Stabley
(74) *Attorney, Agent, or Firm*—Young Basile (57) ABSTRACT

A vehicle steering device and control method for use in steer-by-wire steering systems. A steering instrument is operable to receive input from a driver and a turning device is operable to turn at least one wheel. A selectively engageable backup clutch is positioned between the steering instrument and the turning device. Engagement of the backup clutch results in a mechanical connection between the steering instrument and the turning device for assisting control of the at least one wheel, and release of the backup clutch results in a separation of the steering instrument and the turning device for steer-by-wire control of the at least one wheel. A controller is operable to switch from the steer-by-wire control to the assisting control when the backup clutch engages during operation of the steer-by-wire control.

20 Claims, 7 Drawing Sheets

FIG. 8

VEHICLE STEERING CONTROLLER AND METHOD

CROSS-REFERENCES TO RELATED APPLICATION

This application claims priority from Japanese Patent Application Serial No. 2005-335067, filed on Nov. 19, 2005, which is incorporated herein in its entirety by reference.

TECHNICAL FIELD

The present invention generally pertains to vehicle steering control through a so-called steer-by-wire system that enables mechanical separation/connection between a manipulable steering instrument, typically a steering wheel, which receives the input manipulations of the driver, and a turning device that turns the steered wheels through a backup clutch.

BACKGROUND

In known so-called steer-by-wire (SBW) systems that include mechanical separation between the steering wheel and the steering mechanism of the front wheels such as, for example, that shown in Japanese Kokai Patent Application No. 2002-225733, a clutch is provided as a backup device for mechanically connecting the steering wheel and the steering mechanism. If a malfunction takes place in a portion of the SBW system, the clutch is quickly connected to stop the SBW control, and switching occurs to an assist control that can reduce the burden of steering on the driver.

BRIEF SUMMARY OF THE INVENTION

According to exemplary embodiments of the invention, a vehicle steering device for steering at least one wheel of a vehicle is provided. According to one such device, the device comprises a steering instrument operable to receive input from a driver, a turning device operable to turn at least one wheel and a selectively engageable backup clutch positioned between the steering instrument and the turning device such that engaging the backup clutch results in a mechanical connection between the steering instrument and the turning device for assisting control of the at least one wheel and releasing the backup clutch results in a separation of the steering instrument and the turning device for steer-by-wire control of the at least one wheel. This device also includes a controller operable to switch from the steer-by-wire control to the assisting control when the backup clutch engages during operation of the steer-by-wire control.

According to another such device, the device includes steering means for receiving instructions for the at least one wheel from a driver, turning means for turning the at least one wheel and clutch means selectively engageable between the steering means and the turning means for mechanically connecting the steering means and the turning means for assisting control of the at least one wheel when the clutch means is engaged and for separating the steering means and the turning means for steer-by-wire control of the at least one wheel when the clutch means is not engaged. This example of the device also includes means for switching from the steer-by-wire control to the assisting control when the clutch means engages during operation of the steer-by-wire control.

Vehicle steering control methods for controlling at least one wheel using a steer-by-wire steering system are also taught herein. The steering system includes a steering instrument and a turning device responsive to signals from the steering instrument and a selectively engageable backup clutch between the steering instrument and the turning device. One example method comprises operating the steer-by-wire steering system according to a steer-by-wire control when the a release instruction is sent to the backup clutch, operating the steer-by-wire steering system according to an assisting control when the backup clutch is engaged so as to mechanically couple the steering instrument and the turning device, and switching from the steer-by-wire control to the assisting control when the backup clutch engages during operation of the steer-by-wire control.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Known steer-by-wire (SBW) systems suffer from several problems. If a malfunction does not occur in the SBW system, and the known backup clutch is erroneously connected, the structure may continue SBW control. As a result, steering wheel sticking may take place. That is, in the case of erroneous connection of the backup clutch, the turning actuator is driven such that the actual turning angle is brought to follow the instruction turning angle under SBW control. In this case, because the steering wheel and the steered wheels are mechanically connected to each other, corresponding to steering of the steered wheels the steering wheel is rotated, and the instruction turning angle is changed. As a result, a state without a reduced deviation between the instruction turning angle and the actual turning angle results. The turning torque may increase and steering sticking may take place.

According to the embodiments of the invention illustrated in FIGS. 1-8, these problems of steering sticking caused by erroneous connection of the backup clutch are resolved or improved.

Figure 1:
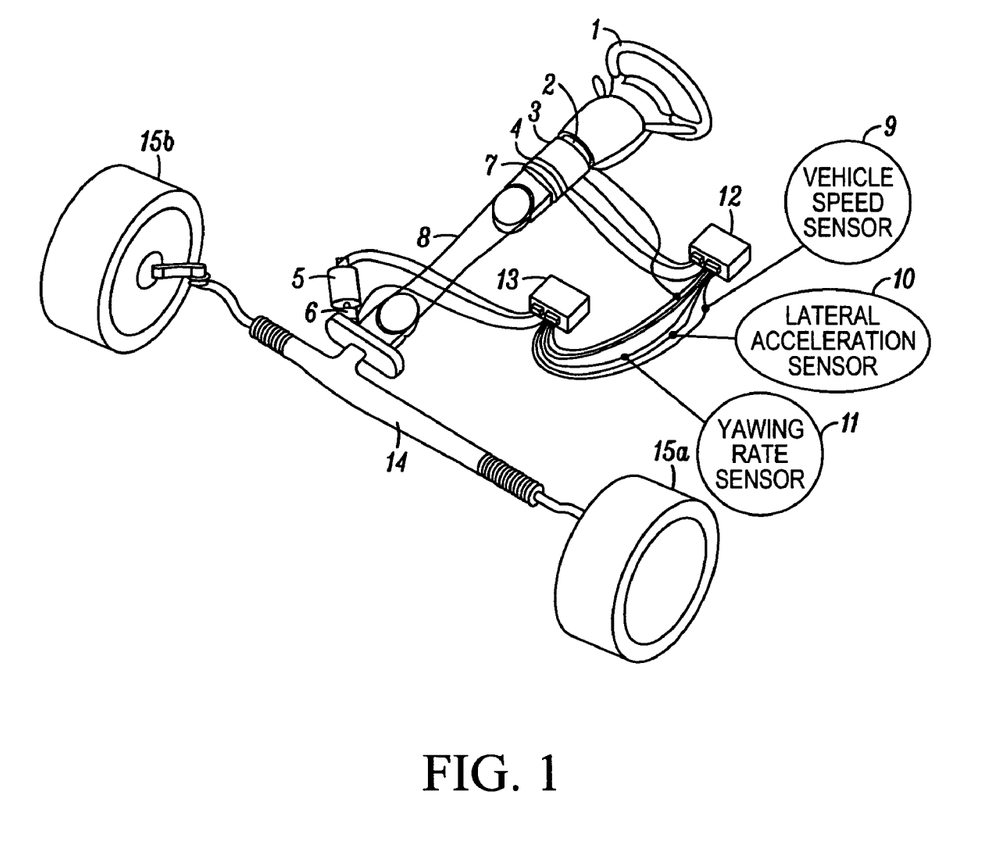
FIG. 1 is a diagram illustrating a steer-by-wire (SBW) system with the vehicle steering controller of a first embodiment.

Specifically, FIG. 1 is a diagram illustrating the steer-by-wire (SBW) system including a first embodiment of the vehicle steering controller. The first embodiment of the SBW system includes the following parts: steering wheel 1, torque sensor 2, steering reactive force actuator 3, steering angle sensor 4, turning actuator 5, turning angle sensor 6, backup clutch 7, backup cable 8, vehicle speed sensor 9, lateral acceleration sensor 10, yawing rate sensor 11, steering reactive force device controller 12, turning device controller 13, steering mechanism 14, left front wheel 15a (steered wheel) and right front wheel 15b (steered wheel).

For the first embodiment of the SBW system, mechanical separation/connection between steering wheel 1 that receives the steering input from the driver and steering mechanism 14 that turns front wheels 15a, 15b via backup cable 8 is employed. When steering wheel 1 and steering mechanism 14 are mechanically separated from each other, backup clutch 7 is released. Conversely, when steering wheel 1 and steering mechanism 14 are mechanically connected to each other, backup clutch 7 is connected.

When backup clutch 7 is released, steering wheel 1 does not control steering mechanism 14 through back up clutch 7 and backup cable 8. Rather, turning actuator 5 is driven according to the instruction turning angle corresponding to the manipulated state of steering wheel 1, and SBW control is performed to drive steering reactive force actuator 3 so that a steering reactive force torque is imparted corresponding to the steering state of front wheels 15a, 15b.

Also, when SBW control is not possible, but assisting control is allowed, backup clutch 7, steering wheel 1 and steering mechanism 14 are connected via backup cable 8. Based on the turning torque signal from torque sensor 2, assisting control is performed to drive at least one of the steering reactive force actuator 3 and turning actuator 5 so that an assisting torque is added to the manipulation of the steering wheel 1 by the driver.

In the first embodiment, if backup clutch 7 is in the connected state when a release instruction is output to backup clutch 7, backup clutch 7 is determined to be in an erroneous connection. Switching of steering control is performed from SBW control to assisting control.

Figure 2:
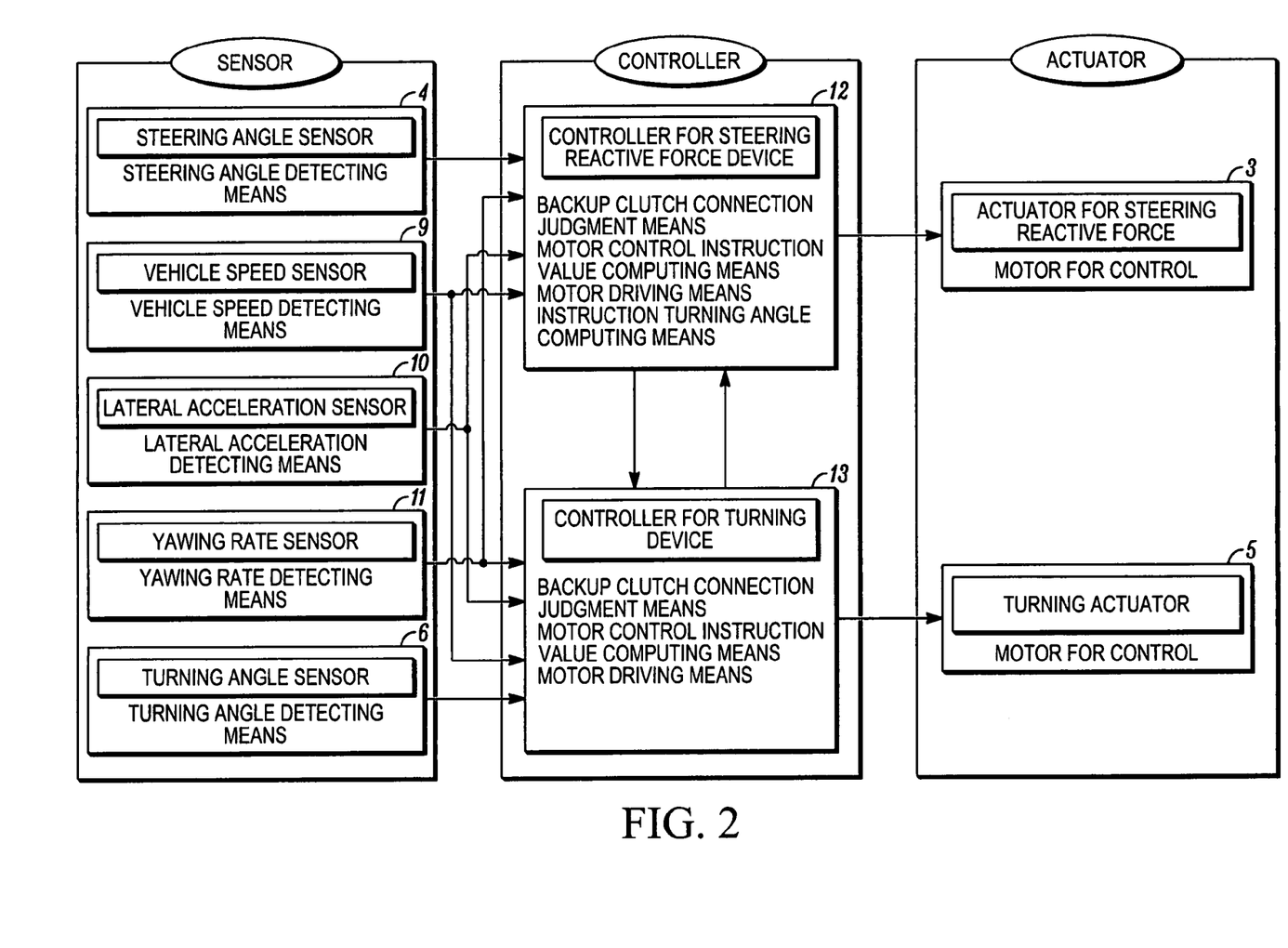
FIG. 2 is a block diagram illustrating the control system of the SBW control in the first embodiment.

FIG. 2 is a block diagram illustrating the control system of the SBW control in the first embodiment. The following signals are input to steering reactive force device controller 12: a turning torque signal from torque sensor 2, a steering angle signal from steering angle sensor 4, a vehicle speed signal from vehicle speed sensor 9, a lateral acceleration signal from lateral acceleration sensor 10 and a yawing rate signal from yawing rate sensor 11. The following signals are input to the steering device controller 13: the turning torque signal from torque sensor 2, the vehicle speed signal from vehicle speed sensor 9, the lateral acceleration signal from lateral acceleration sensor 10, the yawing rate signal from yawing rate sensor 11 and a turning angle signal from turning angle sensor 6. According to the example shown, the controllers 12, 13 are controlled by a single standard microcontroller incorporated in one of the controllers 12, 13 or a controller remote from each of the controllers 12, 13. In either case, it includes a central processing unit (CPU), random access memory, read only memory and input/output ports receiving input signals and sending output signals as discussed in more detail below. The functions, or parts, of each of the controllers 12, 13 described herein are generally programming instructions stored in memory and are performed by the logic of the CPU. Of course, each of the controllers 12, 13 that perform the functions described herein could include their own dedicated microcontroller or could include microprocessors using external memory.

Steering reactive force device controller 12 includes several parts, a motor control instruction value computing part or means, a motor driving part or means, an instruction turning angle computing part or means, and a backup clutch connection judgment part or means.

Backup clutch connection judgment part determines the connection/release state of backup clutch 7. Based on the instruction steering reactive force torque computed from the various input signals, motor control instruction value computing part computes a motor control instruction value. Motor driving part computes a current instruction value from the motor control instruction value, and it drives the control motor of steering reactive force actuator 3 so that the turning torque detected with torque sensor 2 comes into agreement with the instruction steering reactive force torque. Based on the various input signals, instruction turning angle computing part computes the instruction turning angle of front wheels 15a, 15b.

Turning device controller 13 includes a backup clutch connection judgment part or means, a motor control instruction value computing part or means and a motor driving part or means. Backup clutch connection judgment part determines the connection/release state of backup clutch 7. Based on the various input signals and the instruction turning angle, motor control instruction value computing part computes the motor control instruction value. Motor driving part computes the current instruction value from the motor driving instruction value, and it performs driving control for the control motor of turning actuator 5 so that the actual turning angle detected with turning angle sensor 6 is in agreement with the instruction turning angle.

Figure 3:
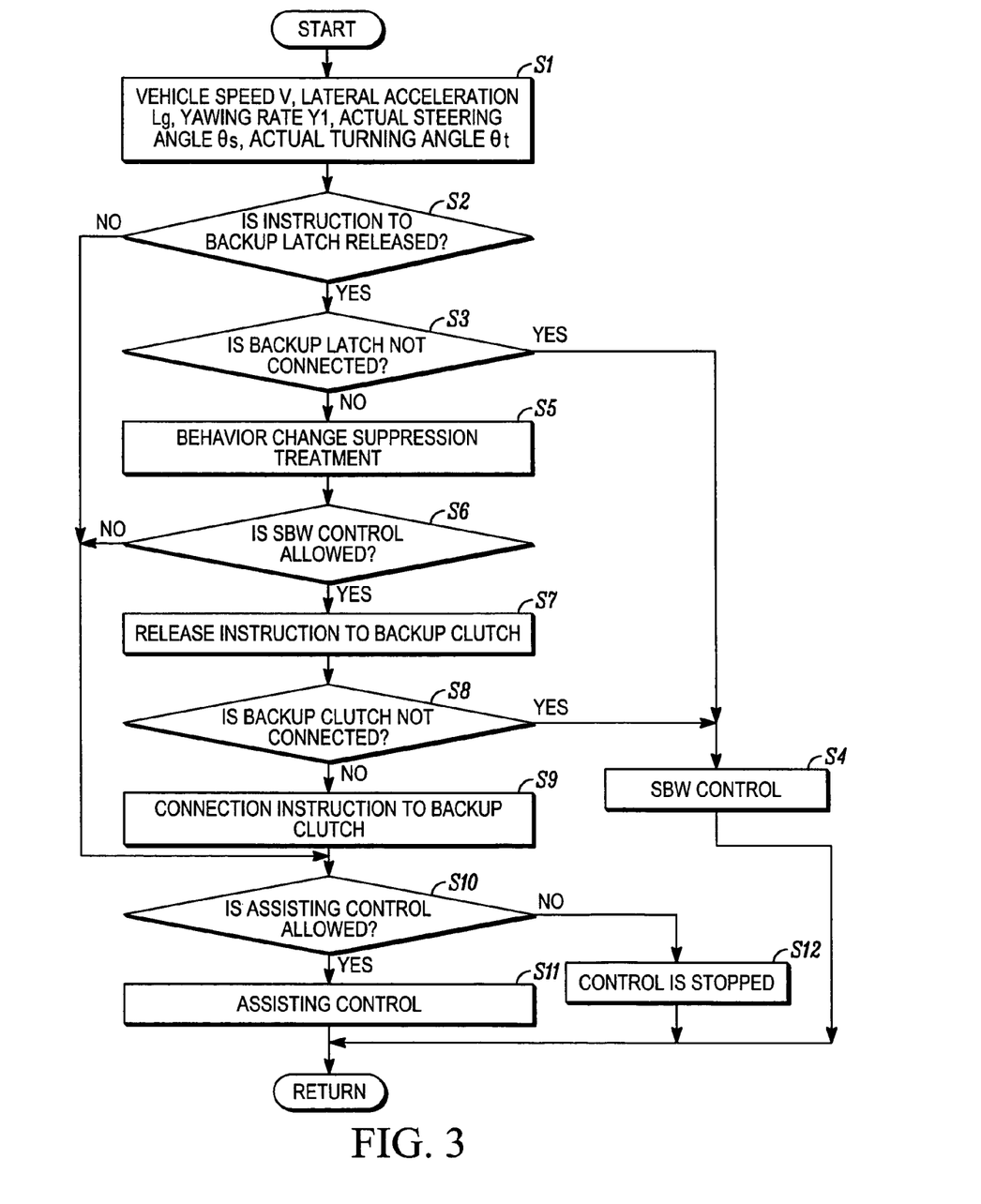
FIG. 3 is a flow chart illustrating the flow of steering control processing performed using steering reactive force device controller 12 and turning device controller 13 shown in FIG. 2 in first embodiment.

FIG. 3 is a flow chart illustrating the flow of the steering control processing executed by steering reactive force device controller 12 and steering device controller 13 in the first embodiment. An explanation is provided regarding the various process steps for steering control switching means. This control processing, for example, is started when the SBW system boots up, such as when the ignition key switch is turned ON or other ignition system is activated.

In step S1 vehicle speed V is read from vehicle speed sensor 9, and lateral acceleration Lg is read from lateral acceleration sensor 10. Also, yawing rate Y1 is read from yawing rate sensor 11. Finally, actual steering angle θs is read from steering angle sensor 4, and actual turning angle θt is read from turning angle sensor 6. The process then moves to step S2.

In step S2 a query is made as to whether the instruction to backup clutch 7 is a release instruction. If YES, the present instruction state is a release instruction, the process advances to step S3. If the present instruction state is not a release instruction (the answer to the query is NO), the process goes to step S10.

In step S3 of the backup clutch connection judgment part, a determination is made as to whether backup clutch 7 is not connected or is connected. If YES, i.e., the backup clutch 7 is not connected, the process goes to step S4. If NO, i.e., the backup clutch 7 is connected, the process goes to step S5. Here, for example, when the difference between actual steering angular velocity θsv and actual turning angular velocity θtv computed from actual steering angle θs, and actual turning angle θt is smaller than a prescribed value, backup clutch 7 is determined to be connected.

In step S4 SBW steering control is performed for driving steering reactive force actuator 3 and turning actuator 5 based on the instruction values computed with steering reactive force device controller 12 and turning device controller 13. The process then goes to return (repeat starting at step S1).

In step S5 a behavior variation suppressing control processing to be explained later (FIG. 4) is performed in order to minimize variation in the behavior of the vehicle. The process then goes to step S6.

In step S6 a determination is made as to whether SBW control can be performed. That is, the function of determining the possibility of the continuation of steer-by-wire control is performed. If YES, the process advances to step S7. If NO, the process goes to process step S10. Here, this determination is made based on whether malfunctions are occurring in any of the various controllers, actuators, sensors, etc.

In step S7 a release instruction is output to backup clutch 7, and the process advances to step S8.

In step S8, just as in step S3, in the backup clutch connection judgment part, a determination is made as to whether backup clutch 7 is not actually connected. If YES, i.e., the backup clutch 7 is not connected, the process goes to step S4. If NO, i.e., the backup clutch 7 is connected, the process advances to step S9.

In step S9 a connection instruction is output to backup clutch 7, and the process advances to step S10.

In step S10 a determination is made as to whether assisting control is allowed. If YES, the process goes to step S11 where an assisting instruction value (instruction assisting torque) is computed corresponding to the steering torque signal from torque sensor 2. Also, assisting control is performed to drive one of steering reactive force actuator 3 and turning actuator 5 based on the computed assisting instruction value. The process then goes to return.

If the determination is made in step S10 that assisting control is not allowed, that is, the answer is NO, the process goes to step S12 where SBW control is stopped. The process then goes to return. In this case, it is also possible to adopt a scheme in which a warning lamp is turned ON to warn the driver about an increase in the steering force.

Figure 4:
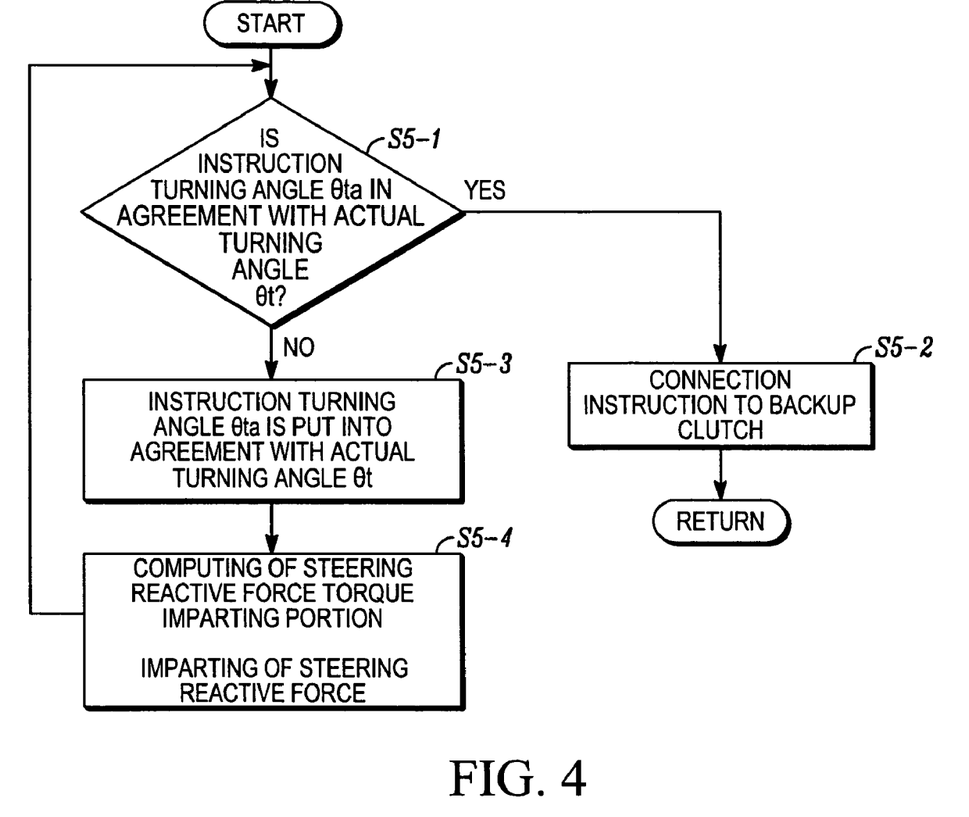
FIG. 4 is a flow chart illustrating the flow of the behavior variation suppressing control processing performed in process step S5 shown in FIG. 3.

FIG. 4 is a flow chart illustrating the flow of the behavior variation suppressing control processing performed in step S5 shown in FIG. 3. Hereinafter, an explanation is given regarding the various process steps.

In step S5-1, a query is made as to whether instruction turning angle θta is in agreement with actual turning angle θt. If YES, the process goes to step S5-2 where a connection instruction is output to backup clutch 7. The process goes to return.

On the other hand, if instruction turning angle θta is not in agreement with actual turning angle θt, the process goes to step S5-3 where instruction turning angle θta is made identical to actual turning angle θt. Then process goes to step S5-4.

In step S5-4 a steering reactive force torque imparting portion is computed corresponding to instruction turning angle change amount θtac as the difference between actual turning angle θt computed in step S5-3 and instruction turning angle θta. The steering reactive force torque imparting portion is added to the steering reactive force torque. The process then returns to step S5-1.

When instruction turning angle θta is in agreement with actual turning angle θt, as shown in the flow chart of FIG. 4, the process goes from step S5-1 to step S5-2, backup clutch 7 is connected, and the behavior variation suppressing control operation comes to an end.

When instruction turning angle θta is not in agreement with actual turning angle θt, the process goes from step S5-1 to step S5-3 and then to step S5-4. After instruction turning angle θta is put into agreement with actual turning angle θt in step S5-3, in step S5-4 a steering reactive force torque practically corresponding to instruction turning angle change amount θtac is added to the steering reactive force torque.

Then, the process goes from step S5-1 to step S5-2, backup clutch 7 is connected, and the behavior variation suppressing control operation comes to an end.

When backup clutch 7 is in normal operation (released), as shown in the flow chart in FIG. 3, the process goes from step S1 to step S2 to step S3 and then to step S4. This flow is performed repeatedly, so that SBW control is continued.

When backup clutch 7 is erroneously connected, the process goes from step S1 to step S2 to step S3 and then to step S5. After instruction turning angle θta is put into agreement with actual turning angle θt in step S5, backup clutch 7 is connected.

Then, when it is determined that SBW control can be continued in step S6, the process goes from step S6 to step S7 and then to step S8. In step S7 backup clutch 7 that was connected in step S5 is released. In step S8, a query is made as to whether backup clutch 7 is actually released. If backup clutch 7 is released the process goes to step S4, and SBW control is continued. On the other hand, when backup clutch 7 is not released in step S8, in step S9 backup clutch 7 is connected. After the contradiction between the instruction to the clutch and the actual clutch state is released, the process goes to step S10.

When it is determined that SBW control cannot be continued in step S6, the process goes from step S6 to step S10 where a determination is made as to whether assisting control can be executed. If assisting control can be executed, the process goes from step S10 to step S11. Steering control is switched to assisting control. Hence, the process goes from step S1 to step S2 to step S10 and then to step S11, and this flow is repeated to continue assisting control.

When if it is determined that assisting control cannot be executed in response to the query of step S10, the process goes from step S10 to step S12 where SBW control is stopped. In this case, a warning lamp can be turned ON, warning the driver about an increase in the steering force.

In an SBW system in which the steering wheel and the steering mechanism of the front wheels are mechanically cut off from each other, if a malfunction takes place in a portion of the system, and SBW control cannot be continued due to problems in the actuator and electrical system, while SBW control is stopped the backup clutch is connected. The steering wheel is connected to the steering mechanism. As a result, when the driver manipulates the steering wheel, steering can be performed. In this case, between the steering reactive force actuator and the turning actuator, at least one actuator that can work normally is used to perform assisting control that augments the steering operation of the driver.

However, for known SBW systems the construction is such that switching is made from SBW control to assisting control only when a malfunction is detected in a portion of the system. Consequently, when the backup clutch is erroneously connected the SBW control is allowed to continue if a malfunction is not detected in the SBW control. As a result, when there is a deviation between the instruction turning angle and the actual turning angle, the turning actuator is turned ON so that the actual turning angle is put into agreement with the instruction turning angle. In this case, because the steering wheel and the steering mechanism are connected to the backup clutch, when the turning actuator is turned ON a steering torque is generated in the direction in which the front wheels are interlocked to the steering wheel to turn it. As a result, because the state is such that the deviation between the actual turning angle and the instruction turning angle corresponding to the steering angle of the steering wheel is not reduced, the steering torque may increase. Sticking may take place.

Usually, as the backup clutch of the SBW system, one may use a 2-way clutch, plural-plate clutch or other electromagnetic clutches. For such electromagnetic clutches, in order to ensure fail-safe operation the structure is such that the clutch is released when current is fed to it, and it is connected due to a spring force or the like when current is cut off. With this structure, even if a release instruction is output on the control side, it is still possible for erroneous connection to take place due to wedge engagement or the force of a spring.

On the other hand, for the vehicle steering controller in the first embodiment of the invention, when a release instruction is output to backup clutch 7, if backup clutch 7 remains connected, backup clutch 7 is determined to be erroneously connected. After checking that SBW control cannot be continued, and assisting control can be executed, switching is performed from SBW steering control to assisting steering control.

That is, as shown in the flow chart of FIG. 3, when it is determined in step S3 that backup clutch 7 is connected although a release instruction was output to backup clutch 7 in step S2, a conclusion is reached that an erroneous connection takes place. The process goes from step S5 to step S6. Then, in step S6 if it is judged that SBW control cannot be continued, and in step S10 if it is judged that assisting control can be executed, in step S11 switching is performed from SBW steering control to assisting control.

As a result, because switching is performed from the mode of control of the angle of turning of front wheels 15a, 15b corresponding to the steering angle of steering wheel 1 to the mode of torque control to apply an assisting torque to steering wheel 1 corresponding to the steering torque, it is possible to suppress the turning torque by the assisting torque, and it is possible to prevent the problem of steering sticking.

Then, in the first embodiment when it is judged that backup clutch 7 is erroneously connected, if a deviation takes place between instruction turning angle θta and actual turning angle θt, after instruction turning angle θta is put into agreement with actual turning angle θt by means of the behavior variation suppressing control processing in step S5, switching occurs to assisting control. As a result, by eliminating the deviation between instruction turning angle θta and actual turning angle θt it is possible to avoid an increase in the turning torque. Also, it is possible to effectively prevent the problem of steering sticking that would otherwise take place when the turning torque rises.

In the behavior variation suppressing control processing shown in FIG. 4, in step S5-4 a steering reactive force torque imparting portion is computed corresponding to instruction turning angle change amount θtac, that is, the difference between instruction turning angle θta and actual turning angle θt. The steering reactive force torque imparting portion is then added to the steering reactive force torque. That is, in the state in which the driver holds steering wheel 1 against the turning torque, when instruction turning angle θta is brought near actual turning angle θt, and because a decrease in the steering reactive force torque also occurs, it is possible to suppress variation in the steering reactive force torque by compensating the steering reactive force torque portion corresponding to instruction turning angle change amount θtac with steering reactive force actuator 3.

Also, in the behavior variation suppressing control processing, after instruction turning angle θta is put into agreement with actual turning angle θt in step S5-2, a connection instruction is output to backup clutch 7. In case of erroneous connection of backup clutch 7, it is unclear if the connection is released. If it is released, there may be a significant variation in the behavior of the vehicle. Here, in the first embodiment, after instruction turning angle θta is put into agreement with actual turning angle θt, and the turning torque is suppressed in that state, a connection instruction is output to backup clutch 7. Hence, a normal state in agreement with the actual clutch state results. As a result, generation of variation in the vehicle behavior in conjunction with release of an erroneous connection of backup clutch 7 can be prevented.

In the first embodiment when it is determined that backup clutch 7 is in an erroneous connection state, after the behavior variation suppressing control processing of step S5, a determination is made as to whether SBW control can be continued in step S6. When SBW control can be continued, a release instruction is output to backup clutch 7 in step S7, and SBW control is continued. That is, when the SBW system performs normal operation, by releasing backup clutch 7 and continuing SBW control even after elimination of the erroneous connection of backup clutch 7, it is still possible to continue a steering control that can realize variable gear ratio control or the like with a higher degree of freedom than that of assisting control.

On the other hand, when SBW control can be continued in step S6, but a release instruction output to backup clutch 7 in step S7 does not release backup clutch 7, in step S9 a connection instruction is output again to backup clutch 7, and it is possible to switch to assisting control to prevent the problem of steering sticking.

For the vehicle steering controller in the first embodiment, the following effects can be obtained. First, when a release instruction is output to backup clutch 7, and a backup connection judgment part (step S2) determines whether or not backup clutch 7 is connected, if backup clutch 7 is connected the vehicle steering controller switches from steer-by-wire control to assisting steering control (step S11). As a result, it is possible to prevent the problem of steering sticking in the case of erroneous connection of the backup clutch.

With the controllers 12, 13, because steering switching is performed to assisting control after change of instruction turning angle θta to actual turning angle θt, it is possible to avoid an increase in the turning torque and to effectively prevent the problem of steering sticking that takes place due to an increase in the turning torque.

With the controllers 12, 13, when instruction turning angle θta is changed to actual turning angle θt, a steering reactive force torque portion corresponding to instruction turning angle change θtac is added to the instruction turning reactive force torque. Accordingly, it is possible to suppress variation in the steering reactive force torque when instruction turning angle θta comes close to actual turning angle θt.

With the controllers 12, 13, because a connection instruction is output to backup clutch 7 after instruction turning angle θta is changed to actual turning angle θt, it is possible to prevent generation of variation in the behavior of the vehicle in the case of release of erroneous connection of backup clutch 7.

The steering reactive force device controller 12 can determine whether steer-by-wire control can be continued (step S6) is set. For the steer-by-wire control device, when it is determined that steer-by-wire control can be continued a release instruction is output to backup clutch 7. Steer-by-wire control is continued. As a result, even after elimination of the erroneous connection of backup clutch 7 it is still possible to continue steering control that can realize variable gear ratio control or the like with a higher degree of freedom than that of assisting control.

In a second embodiment of the invention, in the behavior variation suppressing control processing that is performed in case of erroneous connection of the backup clutch, when the driver holds the steering wheel the instruction turning angle is gradually brought close to the actual turning angle corresponding to the vehicle speed and the vehicle behavior state variables. As far as the construction is concerned, since it is the same as that of the first embodiment shown in FIG. 1, its explanation and figures will not be presented again.

Figure 5:
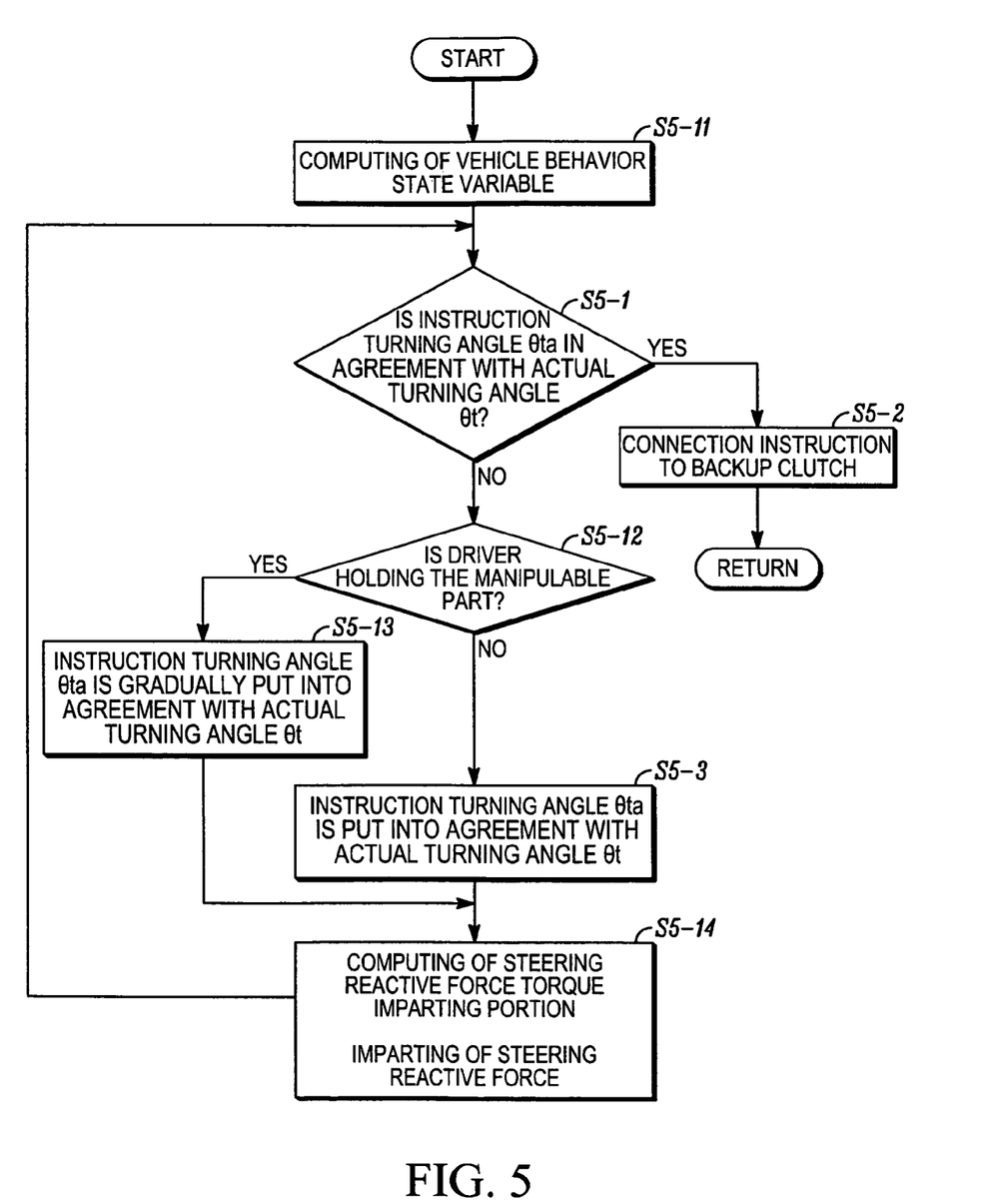
FIG. 5 is a flow chart illustrating the flow of the behavior variation suppressing control processing in a second embodiment.

FIG. 5 is a flow chart illustrating the flow of the behavior variation suppressing control processing in a second embodiment. The same step numbers as those in the first embodiment shown in FIG. 4 are adopted here, and they will not be explained again. Additional steps are next discussed.

In step S5-11 vehicle behavior state variable Sc is computed based on lateral acceleration Lg, yawing rate Y1, actual steering angle θs and actual turning angle θt read in step S1 of FIG. 3. Then, the process goes to step S5-1 discussed previously with respect to FIG. 4.

In step S5-12 of FIG. 5, a query is made as to whether or not the driver is holding steering wheel 1. If YES, i.e., the driver is holding steering wheel 1, the process goes to step S5-13. If NO, the process goes to step S5-3. Here, determination of whether steering wheel 1 is being held can be performed based on the steering torque from torque sensor 2, the steering angle from steering angle sensor 4, the steering angular velocity, etc.

Figure 6:
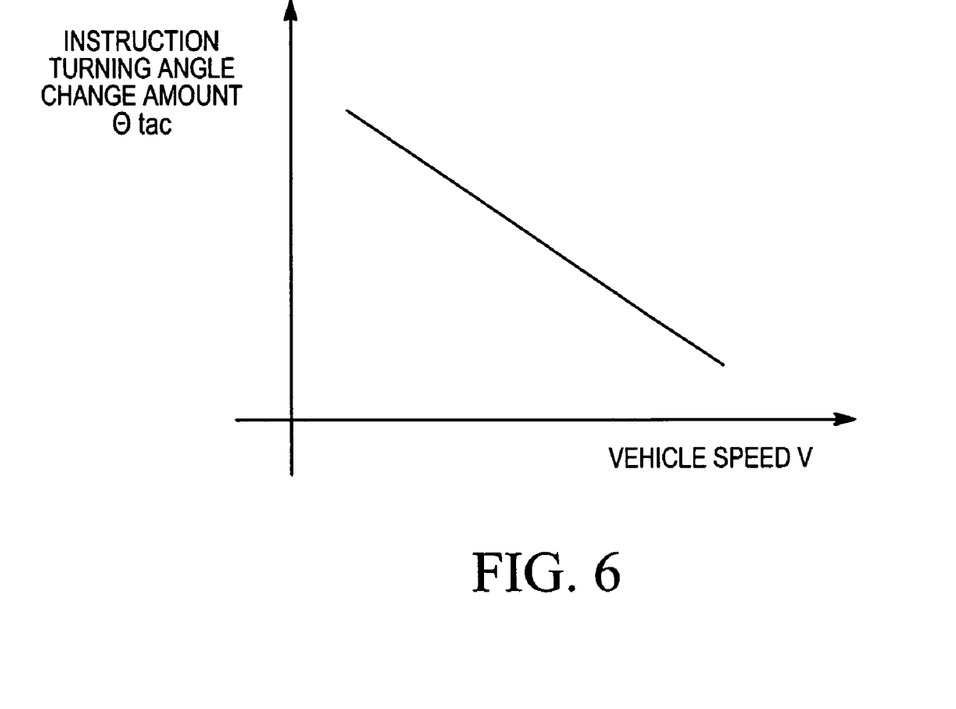
FIG. 6 is a setting map for instruction turning angle change amount θtac corresponding to vehicle speed V in the second embodiment.
Figure 7:
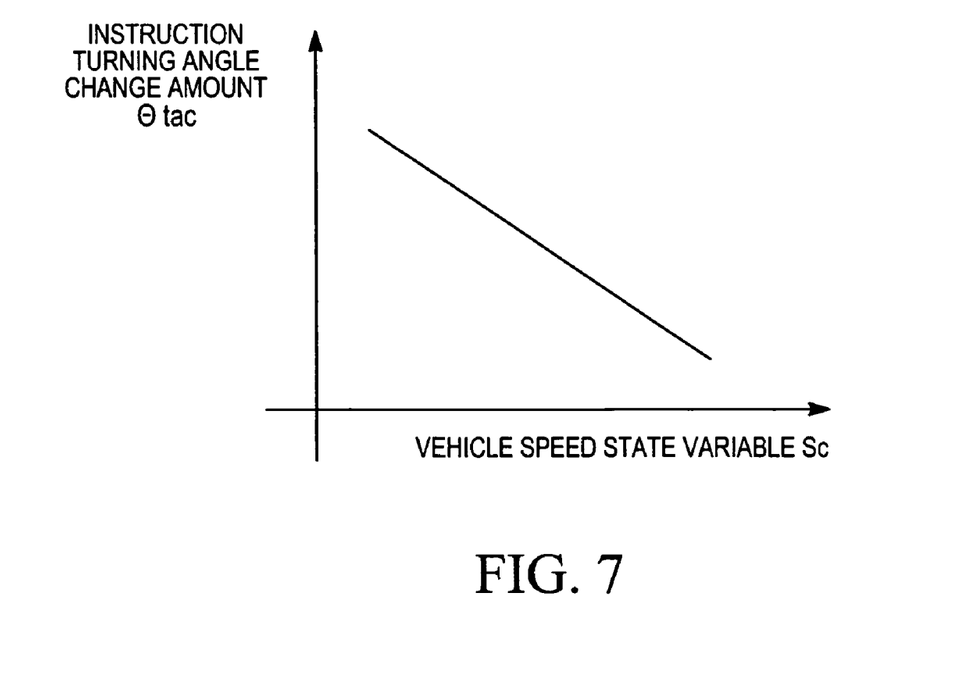
FIG. 7 is a setting map for instruction turning angle change amount θtac corresponding to vehicle speed state variable Sc in the second embodiment.

In step S5-13, based on vehicle speed V read in step S1 shown in FIG. 3 and vehicle behavior state variable Sc computed in step S5-11, and with reference to the maps shown in FIGS. 6 and 7, instruction turning angle change amount θtac is set. At the same time, based on instruction turning angle change amount θtac, instruction turning angle θta is gradually brought to approach actual turning angle θt. The process then goes to step S5-14.

FIG. 6 shows the setting map of instruction turning angle change amount θtac corresponding to vehicle speed V. The higher the vehicle speed V, the smaller the instruction turning angle change amount θtac is set. Also, FIG. 7 shows the setting map of instruction turning angle change amount θtac corresponding to vehicle behavior state variable Sc. The larger the vehicle behavior state variable Sc, the smaller the instruction turning angle change amount θtac is set. In the first embodiment instruction turning angle change amount values are computed, respectively, corresponding to vehicle speed V and vehicle behavior state variable Sc. The mean value of the two values is taken as the final instruction turning angle change amount θtac.

In step S5-14 a steering reactive force torque imparting portion corresponding to instruction turning angle change amount θtac computed in step S5-13 or step S5-3 is added to the steering reactive force torque. The process then returns to step S5-1.

When instruction turning angle θta and actual turning angle θt are not in agreement with each other, if the driver is holding steering wheel 1 as shown in the flow chart of FIG. 5, the process goes from step S5-11 to step S5-1 to step S5-12 to step S5-13 and then to step S5-14. Instruction turning angle θta is gradually brought to approach actual turning angle θt. In this case, the higher the vehicle speed V or vehicle behavior state variable Sc, the slower the instruction turning angle θta approaches actual turning angle θt. Then, after instruction turning angle θta comes into agreement with actual turning angle θt, in step S5-14 a steering reactive force torque portion corresponding to instruction turning angle change amount θtac is added to the steering reactive force torque. The process next goes from step S5-1 to step S5-2, backup clutch 7 is connected, and the behavior variation suppressing control operation comes to an end.

When the driver removes his hands from steering wheel 1, the process goes from step S5-11 to step S5-1 to step S5-12 to step S5-3 and then to step S5-14. After instruction turning angle θta is brought into agreement with actual turning angle θt in step S5-3, in step S5-4 a steering reactive force torque portion corresponding to instruction turning angle change amount θtac is added to the steering reactive force torque. Then, the process goes from step S5-1 to step S5-2, backup clutch 7 is connected, and the behavior variation suppressing control operation comes to an end.

Figure 8:
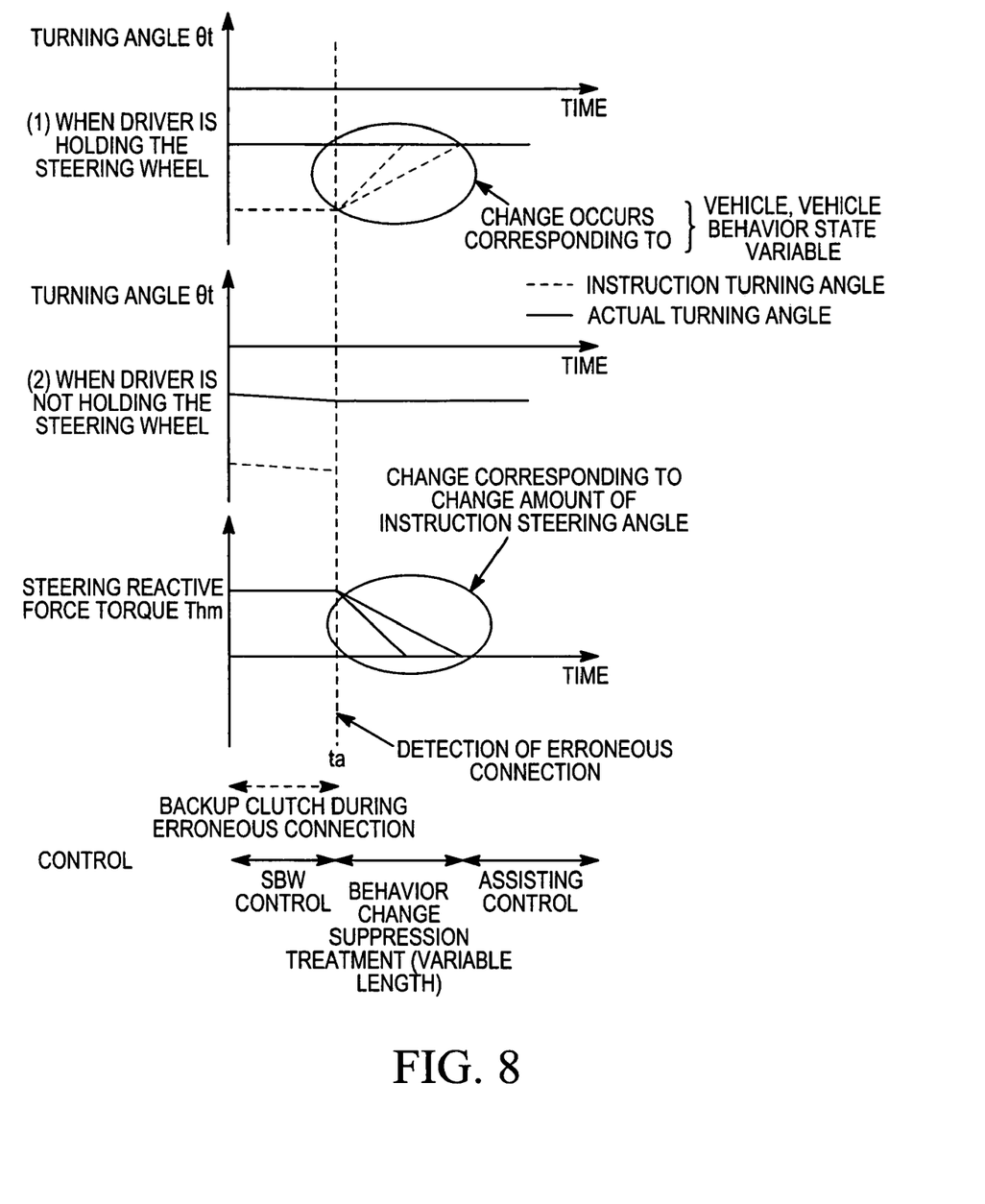
FIG. 8 is a timing chart illustrating the operation in adjusting the instruction turning angle change amount in the second embodiment.

FIG. 8 is a timing chart illustrating the operation in adjusting the instruction turning angle change amount in the second embodiment. As shown in FIG. 8, erroneous connection of backup clutch 7 is detected during SBW control at time ta.

When the driver is holding steering wheel 1, by adjusting instruction turning angle change amount θtac corresponding to vehicle speed V and vehicle behavior state variable Sc, and by having instruction turning angle θta gradually approach actual turning angle θt, it is possible to suppress an increase in the turning torque to reduce variation in the steering torque and to suppress influence on the behavior of the vehicle.

In this case, the higher the vehicle speed V the smaller the instruction turning angle change amount θtac. That is, the higher the vehicle speed V, the larger the influence of variation in the steering torque on the behavior of the vehicle. Also, the higher the vehicle speed V the slower the instruction turning angle θta is brought to approach actual turning angle θt, and the smaller the variation portion. As a result, it is possible to suppress the influence of variation in the steering torque on the vehicle behavior independent of vehicle speed V.

Similarly, the larger the vehicle behavior state variable Sc, such as yawing rate Y1, lateral acceleration Lg, etc., the smaller the instruction turning angle change amount θtac, and the slower the instruction turning angle θta is brought to approach actual turning angle θt. As a result, it is possible to suppress the influence of variation in the steering torque on the behavior of the vehicle independent of vehicle behavior state variable Sc.

When the driver is holding steering wheel 1, it is possible to prevent an increase in the turning torque in company with the erroneous connection of backup clutch 7 at time ta when the erroneous connection of backup clutch 7 is detected because instruction turning angle θta is put into agreement with actual turning angle θt. When instruction turning angle θta is quickly put into agreement with actual turning angle θt, variation in the steering torque takes place. When the driver does not hold steering wheel 1, there is no influence of variation in the steering torque on the driver. As a result, when steering wheel 1 is not held it is possible to prevent an increase in the turning torque by immediately putting instruction turning angle θta into agreement with actual turning angle θt.

For the vehicle steering controller in the second embodiment, in addition to effects described with respect to the first embodiment, other effects can be obtained. The controllers 12, 13 can then work as follows. When the driver is holding steering wheel 1, instruction turning angle θta is slowly brought to approach actual turning angle θt. As a result, it is possible to suppress an increase in the turning torque, it is possible to reduce variation in the steering torque, and it is possible to suppress influence on the behavior of the vehicle.

The controllers 12, 13 work as described. Namely, the higher the vehicle speed V, the smaller the instruction turning angle change amount θtac when instruction turning angle θta approaches actual turning angle θt. As a result, it is possible to suppress the influence of the variation in the steering torque on the behavior of the vehicle independent of vehicle speed V.

The controllers 12, 13 work such that the larger the vehicle behavior state variable Sc, the smaller the instruction turning angle change amount θtac when instruction turning angle θta approaches actual turning angle θt. Thusly, it is possible to suppress the influence of the variation in the steering torque on the behavior of the vehicle independent of vehicle behavior state variable Sc.

In the above, an explanation was provided with reference to the first and second embodiments and other variations. However, the specific construction and operation of the invention is not limited to the first and second embodiments. Changes in the design are also included in the invention.

For example, in the first embodiment an example of erroneous connection of the backup clutch 7 when the difference between actual steering angular velocity θsv and actual turning angular velocity θtv computed from actual steering angle θs and actual turning angle θt is smaller than a prescribed value has been presented. However, the construction and determination method of erroneous connection are not limited to this example. One may also adopt a following scheme whereby when the difference between the nominal response determined from instruction turning angle θta and actual turning angle θt is larger than a prescribed value, the backup clutch is determined to be in an erroneous connection.

In the first and second embodiments examples of steer-by-wire systems equipped with a backup clutch have been presented. However, as long as the system has a backup means or device, it may also be adopted in steer-by-wire systems other than those in the embodiments presented.

Hence, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A vehicle steering device for steering at least one wheel of a vehicle, the steering device comprising:
    a steering instrument operable to receive input from a driver;
    a turning device operable to turn at least one wheel;
    a selectively engageable backup clutch positioned between the steering instrument and the turning device such that engaging the backup clutch results in a mechanical connection between the steering instrument and the turning device for assisting control of the at least one wheel and releasing the backup clutch results in a separation of the steering instrument and the turning device for steer-by-wire control of the at least one wheel; and
    a controller configured to switch from the steer-by-wire control to the assisting control when the backup clutch engages during operation of the steer-by-wire control.

2. The vehicle steering device according to claim 1, further comprising:
    a turning actuator operable to impart a turning force to the turning device; and wherein the controller is configured to perform the steer-by-wire control by driving the turning actuator such that an actual turning angle of the turning device approaches an instruction turning angle based on a steering state signal from the steering instrument.

3. The vehicle steering device according to claim 2, further comprising:
    a steering reactive force actuator operable to impart a steering reactive force on the steering instrument; and
    wherein the controller is configured to perform the steer-by-wire control by driving the steering reactive force actuator such that a steering reactive force corresponding to a turning state signal of the turning part is applied to the steering instrument.

4. The vehicle steering device according to claim 2 wherein the controller is configured to switch from the steer-by-wire control to the assisting control after the instruction turning angle is changed to the actual turning angle.

5. The vehicle steering device according to claim 4 wherein the controller is configured to reduce a change amount of the instruction turning angle as a speed of the vehicle increases when the instruction turning angle approaches the actual turning angle.

6. The vehicle steering device according to claim 4 wherein the controller is configured to reduce a change amount of the instruction turning angle as a vehicle behavior state variable increases when the instruction turning angle approaches the actual turning angle.

7. The vehicle steering device according to claim 4 wherein the controller is configured to switch from the steer-by-wire control to the assisting control by outputting a connection instruction to the backup clutch.

8. The vehicle steering device according to claim 1 wherein the controller is configured to judge whether the steer-by-wire control can continue; and wherein the controller is configured to output a release instruction to the backup clutch when the steer-by-wire control can continue.

9. The vehicle steering device according to claim 1 wherein the controller is configured to perform assisting control by reducing a manipulation force required by the driver as the input to the steering instrument.

10. The vehicle steering device according to claim 9, further comprising:
    a turning actuator operable to impart a turning force to the turning device; and
    a steering reactive force actuator operable to impart a steering reactive force on the steering instrument; and wherein the controller is configured to perform the assisting control by driving at least one of the turning actuator and the steering reactive force actuator to reduce the manipulation force.

11. The vehicle steering device according to claim 1 wherein the controller is configured to detect whether the driver holds the steering instrument.

12. The vehicle steering device according to claim 11 wherein the controller is configured to gradually adjust an instruction turning angle based on the position of the steering instrument to an actual turning angle of the turning device when the driver holds the steering instrument.

13. The vehicle steering device according to claim 12 wherein the controller is configured to reduce a change amount of the instruction turning angle as the instruction turning angle approaches the actual turning angle and a speed of the vehicle increases.

14. The vehicle steering device according to claim 12 wherein the controller is configured to reduce a change amount of the instruction turning angle as the instruction turning angle approaches the actual turning angle and a vehicle behavior state variable increases.

15. The vehicle steering device according to claim 12 wherein the controller is configured to switch from the steer-by-wire control to the assisting control by outputting a connection instruction to the backup clutch.

16. The vehicle steering device according to claim 12, further comprising:

a steering reactive force actuator operable to impart a steering reactive force on the steering instrument; and wherein the controller is configured to add a steering reactive force portion to the steering reactive force, the steering reactive force portion corresponding to a change amount when the instructed turning angle is changed to the actual turning angle.

17. A vehicle steering device for at least one wheel, the steering device comprising:

steering means for receiving instructions for the at least one wheel from a driver;

turning means for turning the at least one wheel;

clutch means selectively engageable between the steering means and the turning means for mechanically connecting the steering means and the turning means for assisting control of the at least one wheel when the clutch means is engaged and for separating the steering means and the turning means for steer-by-wire control of the at least one wheel when the clutch means is not engaged; and means for switching from the steer-by-wire control to the assisting control when the clutch means engages during operation of the steer-by-wire control.

18. A vehicle steering control method for controlling at least one wheel using a steer-by-wire steering system including a steering instrument and a turning device responsive to signals from the steering instrument and a selectively engageable backup clutch between the steering instrument and the turning device, the method comprising:

operating the steer-by-wire steering system according to steer-by-wire control using a controller when a release instruction is sent to the backup clutch;

operating the steer-by-wire steering system according to assisting control using the controller when the backup clutch is engaged so as to mechanically couple the steering instrument and the turning device; and switching from the steer-by-wire control to the assisting control using the controller when the backup clutch engages during operation of the steer-by-wire control.

19. The vehicle steering control method according to claim 18, further comprising:

performing the steer-by-wire control by driving an actual turning angle of the turning device based on a position of the at least one wheel to approach an instruction turning angle based on a steering state signal from the steering instrument.

20. The vehicle steering control method according to claim 19, further comprising:

changing the instruction turning angle to the actual turning angle; and wherein switching from the steer-by-wire control to the assisting control further comprises switching from the steer-by-wire control to the assisting control after the instruction turning angle changes to the actual turning angle.

* * * * *